(12) United States Patent
Sabharwal

(10) Patent No.: US 9,594,756 B2
(45) Date of Patent: Mar. 14, 2017

(54) AUTOMATED RANKING OF CONTRIBUTORS TO A KNOWLEDGE BASE

(71) Applicant: Navin Sabharwal, New Delhi (IN)

(72) Inventor: Navin Sabharwal, New Delhi (IN)

(73) Assignee: HCL America Inc., Sunnyvale, CA (US)

( * ) Notice: Subject to any disclaimer, the term of this patent is extended or adjusted under 35 U.S.C. 154(b) by 43 days.

(21) Appl. No.: 13/841,830

(22) Filed: Mar. 15, 2013

(65) Prior Publication Data

US 2014/0280216 A1 Sep. 18, 2014

(51) Int. Cl.
*G06F 17/30* (2006.01)

(52) U.S. Cl.
CPC .............................. *G06F 17/30011* (2013.01)

(58) Field of Classification Search
CPC .................................................. G06F 17/30011
USPC .......................................................... 707/748
See application file for complete search history.

(56) References Cited

U.S. PATENT DOCUMENTS

| | | | |
|---|---|---|---|
| 6,038,560 A * | 3/2000 | Wical | |
| 6,598,046 B1 * | 7/2003 | Goldberg et al. | |
| 6,718,324 B2 * | 4/2004 | Edlund et al. | |
| 7,747,630 B2 * | 6/2010 | Scofield et al. | 707/748 |
| 8,170,971 B1 * | 5/2012 | Wilson et al. | 706/46 |
| 9,461,876 B2 * | 10/2016 | Van Dusen | H04L 41/04 |
| 2002/0120619 A1 * | 8/2002 | Marso et al. | 707/3 |
| 2008/0201348 A1 * | 8/2008 | Edmonds et al. | 707/101 |
| 2009/0125403 A1 * | 5/2009 | Li | 705/14 |
| 2010/0192005 A1 * | 7/2010 | Das | G06N 5/00 714/2 |
| 2010/0205055 A1 * | 8/2010 | Saraswati | 705/14.49 |
| 2010/0274815 A1 * | 10/2010 | Vanasco | G06F 17/30867 707/798 |
| 2011/0167066 A1 * | 7/2011 | Picault et al. | 707/737 |
| 2011/0231363 A1 * | 9/2011 | Rathod | G06F 17/30867 707/609 |
| 2012/0089617 A1 * | 4/2012 | Frey | 707/748 |
| 2012/0102048 A1 * | 4/2012 | Heer | 707/749 |
| 2012/0158668 A1 * | 6/2012 | Tu et al. | 707/687 |
| 2013/0218866 A1 * | 8/2013 | Qian et al. | 707/714 |

(Continued)

OTHER PUBLICATIONS

Allahbakhsh, Mohammad, et al., "An Analytic Approach to People Evaluation in Crowdsourcing Systems", Technical Report UNSW-CSE-TR-201204, The University of New South Wales, Sydney, Australia, Feb. 2012, 23 pages.*

(Continued)

*Primary Examiner* — Robert Stevens
(74) *Attorney, Agent, or Firm* — Schwegman Lundberg & Woessner, P.A.

(57) ABSTRACT

A system and method is provided to rank contributors to a knowledge base. In an automated operation, a ranking value is calculated for each of a plurality of knowledge-based contributors based both on document information and on personal network information pertaining to the respective contributor. The document information identifies relationships being documents in the knowledge base and the particular contributor, indicating, for example, whether the contributor authored the document, read the document, or rated the document. The personal network information indicates personal connections in the knowledge base between the respective contributors.

35 Claims, 8 Drawing Sheets

(56) References Cited

U.S. PATENT DOCUMENTS

2014/0129371 A1* 5/2014 Wilson et al. ............... 705/26.7

OTHER PUBLICATIONS

Ben Jabeur, Lamjed, et al., "A social model for Literature Access: Towards a weighted social network of authors", RIAO '10, Paris, France, Apr. 28-30, 2010, pp. 32-39.*
Cabanac, Guillaume, "Accuracy of inter-researcher similarity measures based on topical and social clues", Scientometrics, vol. 87, © 2011, pp. 597-620.*
Cazella, Silvio César, et al., "Modeling User's Opinion Relevance to Recommending Research Papers", UM 2005, LNAI 3538, Springer-Verlag, Berlin, © 2005, pp. 327-331.*
Deng, Hongbo, et al., "Formal Models for Expert Finding on DBLP Bibliography Data", 2008 Eight IEEE International Conference on Data Mining, IEEE Computer Society, © 2008, pp. 163-172.*
Harris, Christopher, et al., "Using Hybrid Methods for Relevance Assessments in TREC Crowd '12", Iowa Univ., Iowa City, IA, © 2012, 10 pages.*
Kamps, Jaap, "The Impact of Author Ranking in a Library Catalogue", BooksOnline '11, Glasgow, Scotland, UK, Oct. 24, 2011, pp. 35-39.*
Kazai, Gabriella, et al., "Overview of the INEX 2010 Book Track: Scaling Up the Evaluation Using Crowdsourcing", INEX 2010, LNCS 6932, Springer-Verlag, Berlin, © 2011, pp. 98-117.*
Middleton, Stuart E., et al., "Exploiting Synergy Between Ontologies and Recommender Systems", Semantic Web Workshop 2002, Hawaii, May 2002, pp. 1-10.*
Riggs, Tracy, et al., "An Algorithm for Automated Rating of Reviewers", JCDL '01, Roanoke, VA, Jun. 24-28, 2001, pp. 381-387.*
Rosen-Zvi, Michel, et al., "The Author-Topic Model for Authors and Documents", UAI '04, Arlington, VA, © 2004, pp. 487-494.*
Tamine, Lynda, et al., "Chapter 6: On Using Social Context to Model Information Retrieval and Collaboration in Scientific Research Community", Community-Built Databases, Springer-Verlag, Berlin, © 2011, pp. 133-155.*
Volkovs, Maksims N., et al., "Learning to Rank by Aggregating Expert Preferences", CIKM '12, Maui, HI, Oct. 29-Nov. 2, 2012, pp. 843-851.*
Yang, Kai-Hsiang, et al., "Author Name Disambiguation for Citations Using Topic and Web Correlation", ECDL 2008, Springer-Verlag, Berlin, © 2008, pp. 185-196.*
Datta, Anwitaman, "SoJa: Collaborative Reference Management Using a Decentralized Social Information System", CollaborateCom 2010—Session 3: Online Social Networks, Chicago, IL, Oct. 9-10, 2010, pp. 1-9.*
Chen, Chaomei, et al., "Visualizing a Knowledge Domain's Intellectual Structure", Computer, vol. 34, Issue 3, Mar. 2001, pp. 65-71.*

* cited by examiner

AUTOMATED RANKING OF CONTRIBUTORS TO A KNOWLEDGE BASE

BACKGROUND

Knowledge management systems are often employed to promote effective utilization of knowledge in knowledge bases. Such knowledge bases can comprise large numbers of documents or articles that are contributed to the knowledge base by individuals participating in the knowledge base.

Participation in the knowledge base by individuals in the knowledge base often further comprises rating of documents submitted by other contributors, as well as linking relevant documents, indicating that they have read particular documents, and citing some of the document in the knowledge base in the creation or other documents.

Identification of authoritative individuals in particulars fields within a knowledge base has proven to be complex, particularly if such an individual is to be located in a limited timeframe. Some factors that can be factored into automatically locating desired target individuals can tend to be misleading and to give an inaccurate indication of an associated contributor's authority or importance in the knowledge base within a particular field of interest. The number of people who follow publication by a particular person in the knowledge base can, for example, be indicative of popularity more than of authority.

One example of such a knowledge base may comprise an online web forum in which multiple contributors provide online user-assistance about technical issues relating to a particular hardware or software product. The web forum may, for example, be hosted by a website affiliated with the product. Thus, for example, when a user experiences difficulty in adjusting a particular setting of a software product, she may lodge a query on the web forum, responsive to which one or more knowledge base contributors in the customer support personnel may reply with online comments on the forum, in which advice or suggestions are provided on how to change the particular software setting with which the user is struggling. In a particular responsive comment, a contributor may link to earlier relevant comments, which may include comments by other contributors. These technical support comments may be rated by the users and/or by other contributors, for example by giving comments a thumbs up or a thumbs down, indicating whether or not the comment was found to be helpful, or by giving the comment a number rating. In such an example, the contributors to the knowledge base comprise the technical assistance personnel responding to user queries, and the documents of the knowledge base may include the website comments.

BRIEF DESCRIPTION OF DRAWINGS

Some embodiments are illustrated by way of example and not limitation in the figures of the accompanying drawings, in which like reference numerals indicate like components. In the drawings.

DETAILED DESCRIPTION

Example methods and systems to rank contributors to a knowledge base will now be described. In the following description, for purposes of explanation, numerous specific details are set forth in order to provide a thorough understanding of example embodiments. It will be evident, however, to one skilled in the art that many other embodiments the fall within the scope of the present disclosure may be practiced without these specific details.

Example embodiments provide a method and system to rank contributors to a knowledge base in an automated operation that is based at least in part on both metrics derived from contributions made by the respective contributors to documents in the knowledge base, as well as on metrics derived from structured connections between contributors in personal networks or social networks.

A ranking value may thus be calculated for multiple contributors, the ranking value being reflective of the associated contributor's authority, influence, importance, and/or respect in the knowledge base. For example, a ranking value calculation may be based at least in part on one or more document-related values, such as document contribution volume, ratings of the contributor's documents by other contributors, readership volume, and the like, as well as being based at least in part on personal network-related values, such as the number of followers that are registered to follow the particular contributor in the knowledge base, and the ranking values of those followers.

Figure 1:
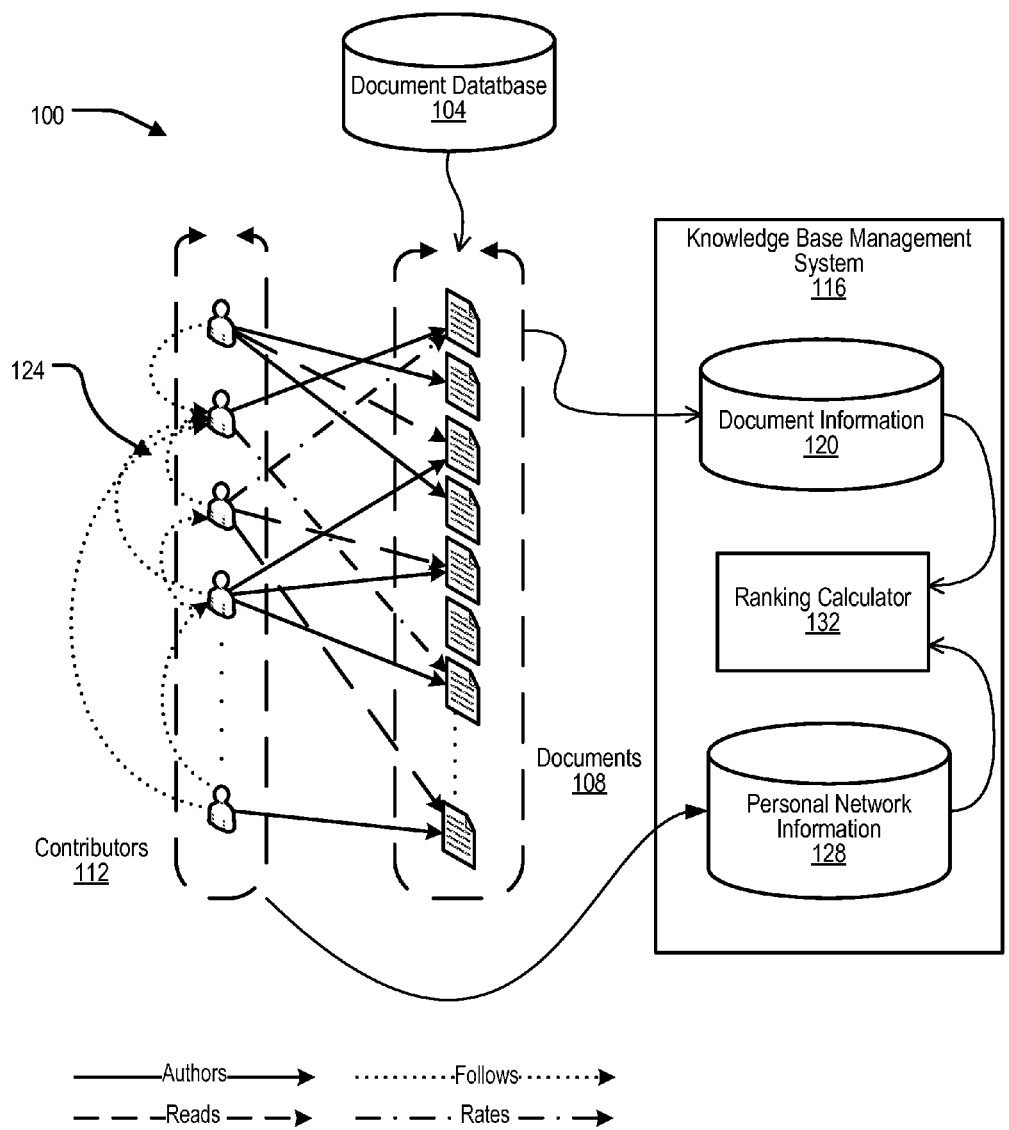
FIG. 1 is a schematic diagram of a knowledge base and a contributor ranking system that forms part of a knowledge base management system, according to an example embodiment.

FIG. 1 schematically shows an example knowledge base 100 with respect to which an example embodiment of a method and system to rank knowledge base contributors will be described. The knowledge base 100 may comprise a document database 104 in which multiple documents 108 are stored. The documents 108 may thus comprise knowledge content that are stored in electronic format in structured relationships to other documents 108 in the knowledge base 100. Each document may be structurally related to one or more contributors 112 to the database. For ease of illustration, FIG. 1 shows a relatively small number of contributors 112 and associated documents 108, but note that knowledge base 100 may in practice comprise much larger volumes of documents 108 and contributors 112.

In one example, the establishment and management of structured relationships between the documents 108 with one another and with the contributors 112 may be effected by storing metadata in association with the respective knowledge documents 108, and/or may be implemented by maintaining separate document records having one or more data fields in which information indicative of structured inter-document relationships and or contributor-document relationships are stored.

Classification information may be provided in association with the respective knowledge documents, to indicate respective knowledge topics to which the document content pertains. Such classification by knowledge topic facilitates searching for documents 108 and/or contributors 112 that concern a particular target knowledge topic.

Such topic-based classification of knowledge documents may be implemented using established methods, for example by tagging each document 108 with one or more topic tags that are stored as metadata linked to the particular document 108. In one embodiment, the knowledge base has a predefined set of knowledge topics, from which a human operator may choose one or more appropriate knowledge topics based on the content of the knowledge document 108.

The knowledge base 100 may thus, in some examples, comprise a system of interconnected or linked documents 108 that are produced under the auspices or purview of a particular organization or entity with which the contributors 112 are associated, such as, for example, a company by whom the contributors 112 are employed, a website on which a platform for communication in the knowledge base 100 is provided, or the like. In other embodiments, the knowledge base 100 may be a collaborative effort in which the contributors 112 are associated with a plurality of separate legal or corporate entities. The knowledge base 100 may accordingly be hosted on a physical infrastructure provided by the hosting organization, or it may be a publicly accessible resource that may be available over a public network, such as the Internet.

A knowledge base management system 116 may be provided to manage the knowledge base 100, for example by maintaining links or associations between the documents 108 and the contributors 112, as well as by managing personal networks or contributor networks.

Contributors 112 may stand in one or more of a predefined set of relationships to respective knowledge documents 108. In this example, the relationships between the contributors 112 and the documents 108 are limited to three predefined types of contributions that a contributor 112 can make to a particular document 108, namely: authoring a document, reading a document, and rating a document.

Thus, when an individual that has a registered profile in the knowledge base 100 creates or authors a particular knowledge document 108 and uploads or links it to the knowledge base 100, that individual is registered as being a contributor 112 whose relationship to the particular document is that he or she is the author of the document. In FIG. 1, authorship of a document 108 is indicated by a solid line between the contributor 112 and the document 108.

Further, contributors 112 may rate documents 108 of other contributors 112, for example by entering a quantified rating value into the knowledge base 100 in association with a particular document 108 after having read or studied it. Such a rating system may take many forms, for example allowing contributors 112 to enter a rating value between zero and 10, providing a binary thumbs-up or thumbs-down rating, or any other appropriate method of rating documents. In FIG. 1, rating of a document 108 by a contributor 112 is indicated by a chain-dotted line between the contributor 112 and the document 108.

Contributors 112 may further interact with the documents 108 by being registered as readers of the documents 108. Thus, for example, contributors 112 may mark or list the documents 108 in the knowledge base 100 that they have read, or the system 100 may automatically track individual reading activity, e.g. by tracking and recording online access to particular webpages or articles. In FIG. 1, readership of a document is indicated by a dotted line between the contributor 112 and the document 108.

The knowledge base management system 116 may monitor or manage the relationships of the contributors 112 to the documents 108. The knowledge base management system 116 may thus generate or maintain document information 120 that indicates and/or defines relationships between the documents 108 and the contributors 112.

Note that a particular contributor 112 may make more than one type of contribution to anyone document 108, for example being both a reader and a rater of a particular document 108. In other embodiments, one or more further contribution types may be provided to provide a record of document contributions made by respective contributors 112.

The knowledge base management system 116 may maintain one or more personal networks that define personal connections between contributors 112 in the knowledge base 100. In one embodiment, the personal contributor networks comprise follower networks 124 that may include registered connections between contributors 112 to follow the documents 108 and/or activities of other contributors 112.

For example, the knowledge base management system 116 may provide the functionality for a contributor 112 to subscribe or register to follow one or more other contributors 112 in the knowledge base 100. An example embodiment of such a personal network or contributor network may be an automated subscription network, in which subscribing contributors (also referred to as "followers," or "follower contributors") may subscribe to receive an automated notification or communication when a particular other contributor 112 (also referred to as the "target contributor" of the particular network) publishes a document 108 on the knowledge base 100, and/or makes any other predefined contribution to the knowledge base 100.

Note that a contributor 112 may be a follower to numerous other target contributors 112 in respective follower networks 128, but that, in this example embodiment, each contributor 112 may be the target contributor 112 of only a single follower network 128 (also referred to herein as the "personal network" of the target contributor).

The knowledge base management system 116 may thus maintain personal network information 128 that indicate structurally defined personal connections in the knowledge base 100 between the contributors 112, in this example being the structured follower networks 128 that are spontaneously formed by the contributors 112's registering to join respective follower networks 128. In other embodiments, network connections between the contributors 112 may include personal networks that are not limited to such automated subscription follower networks, and may in some embodiments include, for example, social networks on social network systems such as Facebook™, LinkedIn™, or the like.

The knowledge base management system 116 also comprises a ranking calculator 132 that implements a method of calculating a ranking value of the respective contributors 112. The ranking value in this example comprises a metric indicative of the contribution, prominence, and/or influence of the respective contributors 112 in the knowledge base 100. The calculation of such a metric value may enable automated ranking of the contributors 112 to the knowledge base 100. In this example embodiment, the ranking calculator 132 calculates a ranking value for each of the relevant contributors 112, the ranking value decreasing with a decrease in prominence or importance of the associated contributor 112.

The calculation of the ranking value for a particular contributor 112 may be based both on the document information 120 for documents to which the contributor 112 has contributed, as well as on the personal network information 128 of the contributor 112. As such, the ranking value is based both on the contributor 112's skill set, as well as his/her social network or personal network. Ranking values may be calculated for the knowledge base 100 as a whole, or for a subset of documents 108 and/or a subset of follower networks 124. For example, a user may wish to calculate ranking values for contributors 112 to a particular knowledge area or topic to which a subset of the documents 108 pertain, in which case one or both of the documents 108 and follower networks 128 taken into consideration by the ranking calculator 132 may be limited to a subset of documents 108 or networks 124 that are linked in the knowledge base 100 with the particular field of knowledge.

Figure 2:
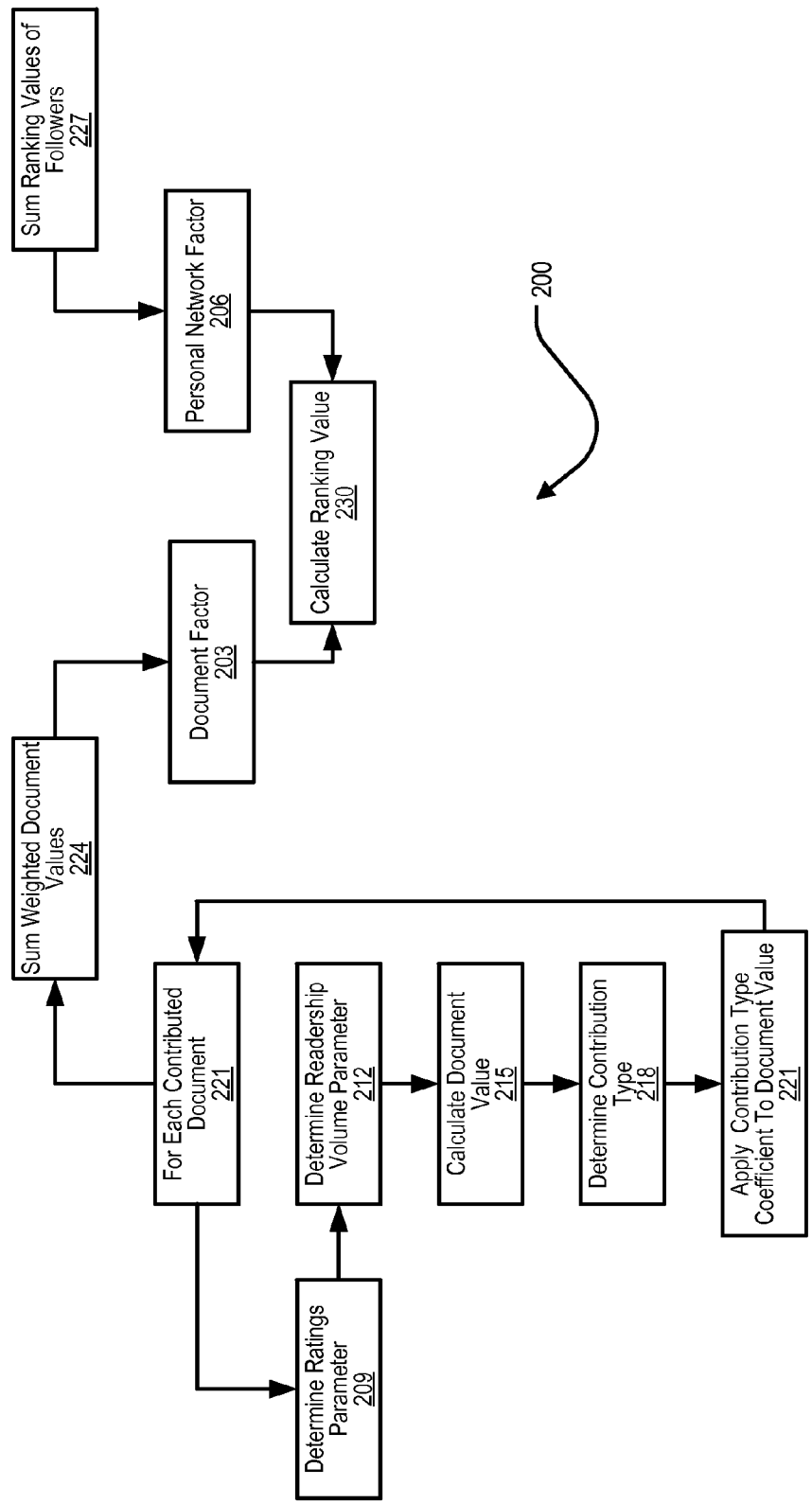
FIG. 2 is a schematic flow chart of an example method of ranking contributors to a knowledge base, in accordance with an example embodiment.

FIG. 2 provides a schematic flow chart 200 of an example method to calculate ranking values for respective contributors 112 in the example knowledge base 100.

The method may comprise calculating, at 203, a document factor for the contributor 112 whose ranking value is to be determined, the document factor representing a quantified cumulative value of contributions of that contributor 112 to the knowledge documents 108 comprising the knowledge base 100; and calculating, at 206, a personal network factor that represents a quantified value of the follower network 128 of which the subject contributor 112 is at the apex.

The document factor may be determined by determining, for each document 108 in the knowledge base 100 to which the contributor 112 is linked, at 209, a ratings parameter derived from ratings of the document by respective contributors 112 of the document; determining, at 212, a readership volume parameter representative of the number of contributors 112 who have read the document 108; and calculating, at 215, a document value based on both the readership volume parameter and the ratings parameter.

The relationship of the contributor 112 to the document 108 may be determined, at 218, by establishing the particular contribution type (e.g., author, reader, or writer). A weighting coefficient may then be applied to the document value, at 221, based on the contribution type, to produce a weighted document value for the respective documents. As mentioned, operations 212 through 221 may be repeated, at 224, for each document with which the subject contributor 112 is linked (e.g., by having made one of the three above-mentioned types of contributions). The weighted document values for all of the documents 108 associated with the contributor 112 may thereafter be summed, at 224, to produce the document factor.

Calculation of the personal network factor may comprise, at 227, summing the respective ranking values of all contributors 112 who are members of the subject contributor 112's follower network, being those contributors 112 who follow the subject contributor 112 in the knowledge base 100.

Thereafter, the document factor and the personal network factor may be combined in a predefined automated operation, at 230, to produce the ranking value for the contributor 112.

The document value of a particular knowledge document 108 (indicated by variable $Dr_j$ in the example formulae that follow) is representative of a weight or significance of the document 108 in the knowledge base 100. As mentioned previously, each document 108 may be categorized based on the associated tags and/or topics that are predefined and that may be associated with the respective documents 108 by the contributors 112 or system operators.

The value of each document 108 is, in this example embodiment, dependent on two associated factors, namely: the number of times the document 108 is read (e.g., the readership volume parameter), and the rating of the document 108 (e.g., the ratings parameter).

The ratings parameter (indicated by variable $R_j$ in the formulas that follow) may thus indicate the number of reads by other contributors 112. The ratings parameter (indicated by variable $Ra_j$ in the formulas that follow) may reflect the rating of the document 108 given to it by contributors 112 on a scale of predefined values.

The ratings parameter and readership volume parameter may contribute to the document value of the associated document 108 by different weights determined by a predefined formula used to calculate the document value.

In this example embodiment, a previously derived mathematical constant (E) is employed to skew the contributions of the ratings parameter and the readership volume parameter to the document value in a predefined ratio, reflecting the insight that the value of a knowledge document 108 is dependent on these factors to different extents.

In this example embodiment, document values for the respective documents 108 associated with the contributor 112 under consideration is:

$$Dr_j = E*R_j + (1-E)*Ra_j \qquad \text{Eq. 1}$$

Where,

E is a fixed constant, in this example being 0.2;

$Dr_j$ is the document value of document j;

$R_j$ is the number of times document j has been read (in this example being the readership volume parameter); and $Ra_j$ is the rating parameter of document j.

The rating parameter ($Ra_j$) may be calculated differently in different embodiments. In this example embodiment, the rating parameter is a cumulative rating parameter that is calculated as the average of all the ratings applied to the document 108 by the respective contributors 112. In other embodiments, the rating parameter may be a weighted average, for example in which the rating values are weighted by the respective rating contributors 112.

The constant E is, in this example, 0.2, but note that different values for this coefficient may be used in other example embodiments. This is because the relative importance of breadth of dissemination and the rating of a document may vary from one field of knowledge to another, may be varied based on the purpose of a particular ranking calculation, or maybe varied based on user preference.

The contribution of a particular document 108 to the ranking value of the associated contributor 112 is weighted according to the type contribution that links the contributor 112 to that document 108. The contribution type may be selected from a predefined set of contribution types. Thus, the above-determined document value accrues to the benefit of the associated contributor 112 in different proportions, depending on whether the contributor 112 is the author, a reader, or a rater of the document 108.

In this example, the greatest weight is attached to authorship of a document 108, and the smallest weight is attached to being a reader of a document 108. This is implemented in the example embodiment by applying a contribution factor (A) to the document value based on the contribution type, the value of the contribution factor being 0.2 for reading the document 108, 0.5 for being the author of the document 108, and 0.3 for having rated or reviewed the document 108, Note that different weightings may be applied for different in other embodiments.

The document factor is calculated by determining the sum of the weighted document values of all documents 108 to which the relevant contributor 112 contributed. This may be expressed as:

$$D_v = \Sigma_{j=1}^{D}[A*(Dr_j)]\} \qquad \text{Eq. 2}$$

Where, $D_v$ is the factor of the particular contributor 112 (referred to here as contributor j) for which the calculation is performed;

A is a weightage coefficient determined by the corresponding type of contribution made by contributor i to document j (e.g., author, review/rate, or read);

$Dr_j$ is the document value of document j (calculated in Eq. 1); and

D is the total number of documents i associated with contributor j.

The ranking value is determined, however, not only by the document factor ($D_v$), but also by a social factor (in this example the personal network factor), which is dependent on the affinity of the contributor 112 with contributors 112 to the knowledge base 100, as reflected by the personal network information 128.

The personal network factor is dependent on the ranking values of the contributors 112 that are members of the follower network 128 of the contributor 112 under consideration. In this example embodiment, the personal network factor is provided by summing or adding together the respective ranking values of all the followers of the contributor 112, which may be expressed as follows:

$$\text{Personal Network Factor} = \Sigma_{k=1}^{followers}(Pr_k) \qquad \text{Eq. 3}$$

Where, $Pr_k$=Rank of a contributor k.

followers=number of followers the relevant contributor 112.

The relative contributions of the personal network factor and the document factor to the ranking value is in this example determined by a predefined weightage constant (d) that is applied to the document factor, its unitary complement (1−d) being applied to the personal network factor. The ranking value may thus be given by:

$$Pr_i = \{d*D_v + (1-d)*[\Sigma_{k=1}^{followers}(Pr_k)]\} \qquad \text{Eq. 4}$$

Where, d is a fixed constant factor to distinguish the weightage due to document association and rank of followers (the value of d in this embodiment being 0.6;

$Pr_i$ is the ranking value of a person i;

followers is the number of followers of i; and $D_v$ is the document factor for person i, as given by Eq. 2 above.

Note that the followers in the network of a particular contributor 112 whose ranking value is being determined at a particular time may themselves be contributors 112 to the knowledge base. Those contributors may of course have respective ranking values that may be influenced (directly or indirectly) by the newly calculated ranking value of the target contributor 112. Consider, for example that two contributors 112 may be followers of one another, so that changes in the ranking value of one of these two contributors 112 automatically result in changes to the ranking value of the other, and vice versa. Similar considerations apply when the follower networks of two such contributors 112 are indirectly linked. Iterative calculation of the ranking values of multiple contributors 112 may be employed to account for the recursive nature of the ranking value formula.

Figure 3:
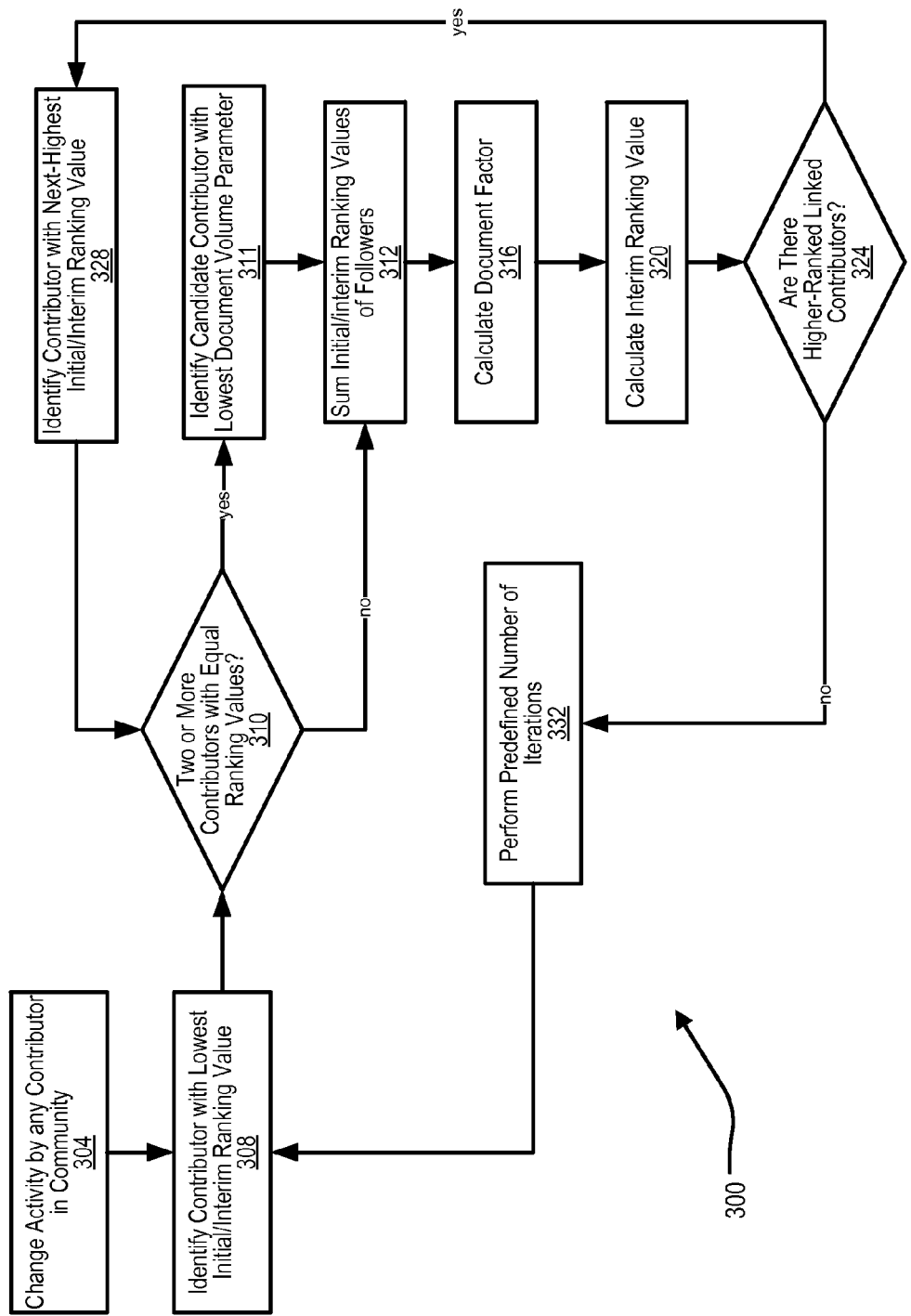
FIG. 3 is a schematic flow chart of an example method of iteratively calculating ranking values for multiple interconnected contributors to a knowledge base.

FIG. 3 shows a schematic flowchart that illustrates an example embodiment of a method 300 of such iterative calculation. To this end, the iterative calculation of the ranking values of multiple contributors 112 may be triggered, at 304, by any activity that may influence the ranking value of one or more contributors 112. For example, a change to the follower network 128 of any contributor 112 would influence the personal network factor of the target contributor 112, and may thus serve as a change activity that triggers iterative ranking value calculation. Similarly, the reading or rating of an existing document 108 may change the document value of the associated document, affecting the document factor for the associate contributor 112 and thus serving as a change activity that triggers iterative calculation. Similar considerations apply when a new document 108 is contributed by any of the contributors 112.

Iterative calculation of the ranking values may comprise calculating interim ranking values for the respective contributors 112 in a sequence determined at least in part by respective initial ranking values, with contributors 112 having lower initial ranking values being earlier in the sequence. The method 300 may thus comprise identifying the contributor 112 with the lowest initial ranking value, at 308, and thereafter calculating an interim ranking value for that contributor 112 based on summing the ranking values of the contributor 112's followers, at 312, and calculating the document factor for that contributor 112, at 316.

If, however, it is determined, at 310, that there are two or more contributors 112 with equal ranking values (further referred to as candidate contributors 112), the candidate contributor 112 with the lowest number of contributions to associated documents 108 may be identified, at 311, and may be placed next in sequence of calculation. The number of associated documents may thus provide a document volume parameter, with the method 300 comprising forming the sequence for iterative calculation such that, of the plurality of contributors 112, those with higher document volume parameters are later in the sequence.

In other embodiments, tiebreaking between contributors 112 of equal ranking value may take into consideration the type of contributions made to respective documents 108, such as by identifying contributors 112 with a greater number of low value types of contributions (e.g., reading vs. authoring) for earlier calculation. In instances where there has not previously been calculation of any ranking values for the respective contributors 112, the contributors may be given equal initial ranking values, so that the calculation sequence in a first iteration of the process for a new contributor community may be determined exclusively by the tie-breaking factor, e.g. by the volume are documents 108 to which contributions have respectively been made.

When calculation of the interim ranking value of the first contributor 112 in sequence is completed, at 320, it is determined, at 324, whether or not there are any higher-ranked link contributors 112. Note that multiple contributors 112 that are directly and/or indirectly linked to a respective follower network 128 may form a community of contributors 112 whose ranking values are dependent on one another and whose ranking values are therefore recalculated in the iterative computation of method 300. The determination at 324 may therefore be limited to contributors 112 forming part of the relevant community of contributors 112.

If the determination at 310 is positive, and then the next contributor 112 in sequence is determined, e.g. by identifying the contributor 112 with the next-highest initial ranking value, at 311, and determining the candidate contributor 112 with the lowest document value parameter, if necessary. Thereafter, the interim ranking value for the next contributor 112 is calculated, the interim ranking value for the first-calculated contributor 112 being used in determining the personal network factor for the currently considered contributor 112, at 316. Note that the interim ranking values for the lower-ranked contributors 112 are thus factored into the subsequent calculation of the interim ranking values for those contributors 112 having a higher initial ranking value, and of which one or more of the lower-ranked contributors 112 are followers. The interim ranking values thus propagate through the interrelated set or community of contributors 112. A single iteration of this process comprises calculating interim ranking values for all of the related contributors 112 that are members of a set of contributors 112 whose ranking values are to be calculated.

When one iteration of calculating ranking values for each of the contributors 112 in that the community is completed, it is determined, at 324, that there are no higher-ranked contributors 112, then it is determined, at 332, whether or not another iteration of the ranking value calculation is to be performed. For subsequent iterations of the calculation, the contributor sequence for ranking value calculation may be determined similarly to that described above, but may be based on the latest interim ranking values, rather than on the initial ranking values for the respective contributors.

In this example, the sequence of ranking value calculations are repeated for a predefined number of iterations, and the determination at 332 is thus based on determining whether or not the predefined number of iterations has been performed. In other embodiments, the calculation sequence may be repeated until successively produced interim ranking values stabilize across iterations, upon which the interim ranking values of the last iteration is taken as the respective ranking values produced by the calculation operation.

A yet more specific example method of calculating the respective ranking values for contributors 112 to a knowledge base will now be described with reference to a simplified community of contributors to an example knowledge base 100 shown in FIG. 4.

Figure 4:
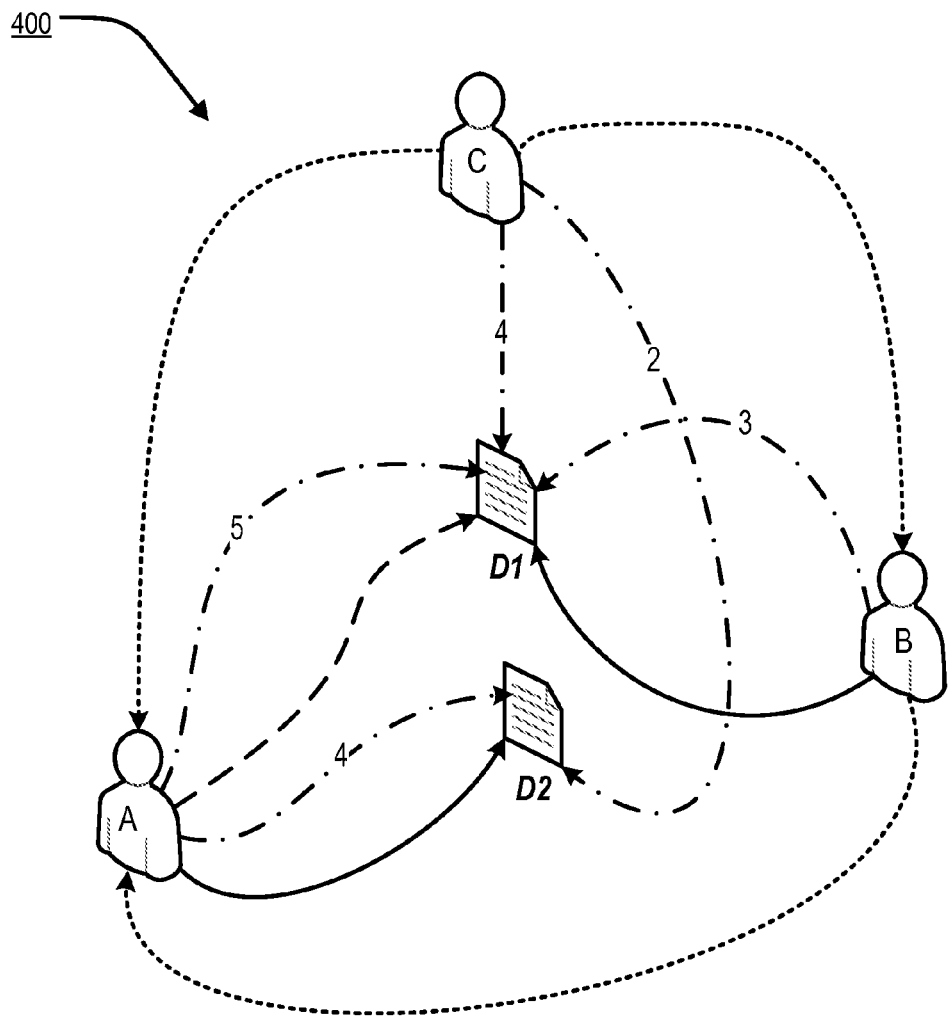
FIG. 4 is a schematic diagram of a simplified knowledge base comprising a number of contributors and documents, according to an example embodiment.

The simplified knowledge base 400 of FIG. 4 comprises two documents (say D1 and D2) to which three contributors 112 (say A, B, and C) have contributed.

Contributor A is the author of document D2, has rated document D2 by giving it a rating value of 4 out of 5 (hereafter indicated in the format 4/5), has read D1, and has rated D1 5/5. Contributor B is the author of document D1, and has rated both document D1 and document D2 3/5. Contributor C has rated document D1 as 4/5 and document D2 as 2/5.

As for follower networks in the knowledge base 100, contributor C follows contributor B, and contributor A is followed by both contributor B and contributor C. Thus, the follower network of contributor A consists of contributors B and C, while the follower network of contributor B consists of C.

Document D1 has thus been read by three contributors (A, B, and C) and has an average rating of 4/5, or 0.8. Document D2, on the other hand, has two reads and a rating of 3/5, or 0.6. Note that, in this example, a contributor 112 who has rated a document 108 is automatically considered as also having read the document, regardless of whether or not reading of that document 108 by the contributor 112 has explicitly been recorded.

In this example, the weightage coefficient (A) of Equation 2 is again 0.2 for reading, 0.5 for writing/authoring, and 0.3 for rating/reviewing. A value of 0.2 is again used as the rating/readership weightage constant (E) of Equation 1, and a value of 0.4 is again used as the document/network weightage constant of Equation 4.

Document values for D1 and D2 may be calculated according to Equation 2, as follows:

$$Dr_1 = 3*E + 0.8*(1-E) = 3*0.2 + 0.8*0.8 = 1.24$$

$$Dr_2 = 2*E + 0.6*(1-E) = 0.4 + 0.48 = 0.88$$

In this example, no previous ranking value calculation has been made for the contributors 112, and the contributors 112 are initially assigned equal ranking values. In this example, the initial equal ranking values are a unity value distributed equally, i.e., 0.33.

The initial sequence of calculation is thus exclusively determined by a document volume parameter. Contributor C has the fewest followers and is thus first in sequence when ranking value recalculation is triggered. Thus, responsive to a trigger activity, the calculation runs starting from contributor C, continuing with contributor B and then finally contributor A.

At first, contributor C still has a ranking value of 0.33, as there was no change in his activity as of now. An interim ranking value of contributor B is now calculated according to Equation 4 (incorporating Equation 2) as:

$$Pr_B = d*A*Dr_1 + (1-d)*Pr_C$$
$$= 0.4*0.5*1.24 + 0.6*0.33 = 0.248 + 0.198 = 0.446.$$

The interim ranking values of contributors B and C are now factored into calculation of an interim ranking value for contributor A, in similar fashion:

$$Pr_A = d*(A*Dr_1 + A*Dr_2) + (1-d)*(Pr_B + Pr_C)$$
$$= 0.4*(0.2*1.24 + 0.5*0.88) + 0.6*(0.446 + 0.33)$$
$$= 0.7408.$$

Note that, in this example, a next iteration of the calculations will give the same results, upon which the iterations may be halted. The non-recursive nature of the ranking value calculations for this example of the contributor community (if calculated in sequence of increasing ranking value) is due to the particular arrangement of follower networks, and would not apply when the follower networks are recursively formed.

For example, if, say, contributor A begins to follow contributor C, a circular ranking value arrangement is constituted, as A is following C and C is following A. In such a case, changing of the follower network arrangement may constitute a change activity, and may trigger the ranking value calculation algorithm. Ranking values of all the contributors may then be calculated, calculated starting with C.

It is then determined (see operations 308-311 in FIG. 4) that C and B have the smallest number of followers and that C is associated with fewer document 108 than B, so the ranking value of C is calculated first, continuing with B and then finally A.

But, after first calculation of contributor A's interim ranking value, contributor C's ranking value may also tend to change. This is because contributor A is a member of contributor C's follower network, so that the ranking value contributor A contributes to the personal network factor (and hence the ranking value) of contributor C. Therefore, iterations of the ranking values continue for a predefined number of times, or until it is automatically determined that the new interim ranking value is more or less equal to the previous interim ranking value of that person. The interim ranking values at that point are then taken as the final respective ranking values.

An example algorithm for automatically performing the ranking value calculations described above may be summarized as follows:

Step 1: Activity={Read=r; Write=w; Review=x;};
Step 2: For all i=1 to D
{Step 3: $Dr_i=(doc_i\rightarrow reads)*E+(1-E)*doc_i\rightarrow rating;$};
Step 4: Upon activity_change
Step 5: For i=1 to X;
Step 6: For all j=1 to P, starting with the lowest-ranked contributor and continuing with increasing rank and fewest associated documents
Step 7: $L=\Sigma_{(for\ all\ linked\ documents)}(Dr_i-A)$
Step 8: $PRj=d*L+(1-d)[\Sigma_{(followers)}(PRj)]$
Where, L=Sum of (Doc*Dr*activity of the person related to that doc) for all documents he is associated with;
  d=constant factor;
  $\Sigma_{(followers)}(PRj)$=Sum of ranking values (Pr) for each of the followers that the contributor has;
  E=fixed weightage factor; and
  X=fixed number of iterations;
  A=contribution type weightage factor.

Searches of the knowledge base by users may incorporate the ranking values thus calculated. A user may, for example, enter a search query that includes one or more search parameters according to which a subset of the contributors 112 and/or documents 108 may be identified, so that contributors 112 may be ranked in the search results according to the calculated ranking values. Thus, for example, a search query may specify one or more knowledge topics to which the search is to be limited. In response, multiple contributors 112 associated with that knowledge topics may be identified as candidate contributors (the knowledge base 100 thus being filtered according to the specified knowledge topic) whereafter search results may be displayed. The search results may comprise displaying a listing of the candidate contributors 112 in order of their respective ranking values, so that a highest ranked candidate contributor 112 is displayed first in the search result list.

Example System

A more detailed example embodiment of a knowledge base contributor ranking system will now be described with reference to FIGS. 5-8. For ease of reference, similar elements are indicated by the same reference numerals in the respective figures.

Figure 5:
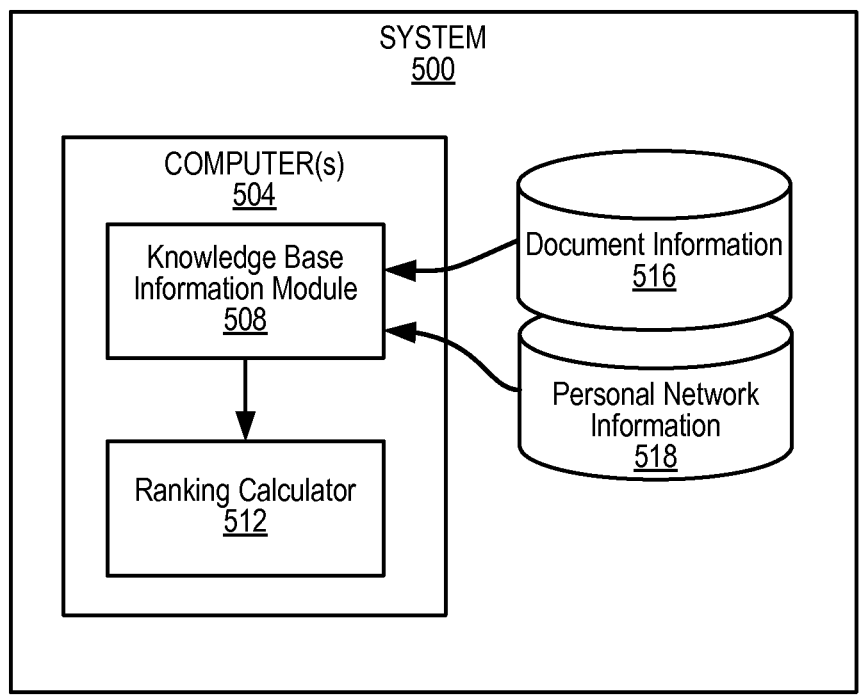
FIG. 5 is a high-level schematic diagram of a knowledge base contributor ranking system in accordance with another example embodiment.

FIG. 5 is a high-level entity relationship diagram of an example configuration of a knowledge base contributor ranking system 500. The system 500 may include one or more computer(s) 504 that comprises a knowledgebase information module 516 to access one or more memories that store document information 516 about documents 108 in a knowledge base 100, and personal network information 518. The document information 516 may identify relationships between the documents 108 and contributors 112 to the knowledge base 100. The personal network information 518 may indicate defined personal connections between the contributors 112 (e.g., follower networks 128). The computer(s) 504 may further comprise a ranking calculator 512 to calculate respective ranking values for two or more of the contributors 112 based at least in part on the document information 516 and on the personal network information 518.

Note that although the system 500 illustrated with reference to FIG. 5 shows, for ease of illustration, representations of a single computer and a single database for each of the document information 516 and the personal network information 518, the elements of system 500 may, in other embodiments, be provided by any number of cooperating system elements, such as processors, computers, modules, and memories, that may be geographically dispersed or that may form part of a single unit.

Example Environment Architecture

Figure 6:
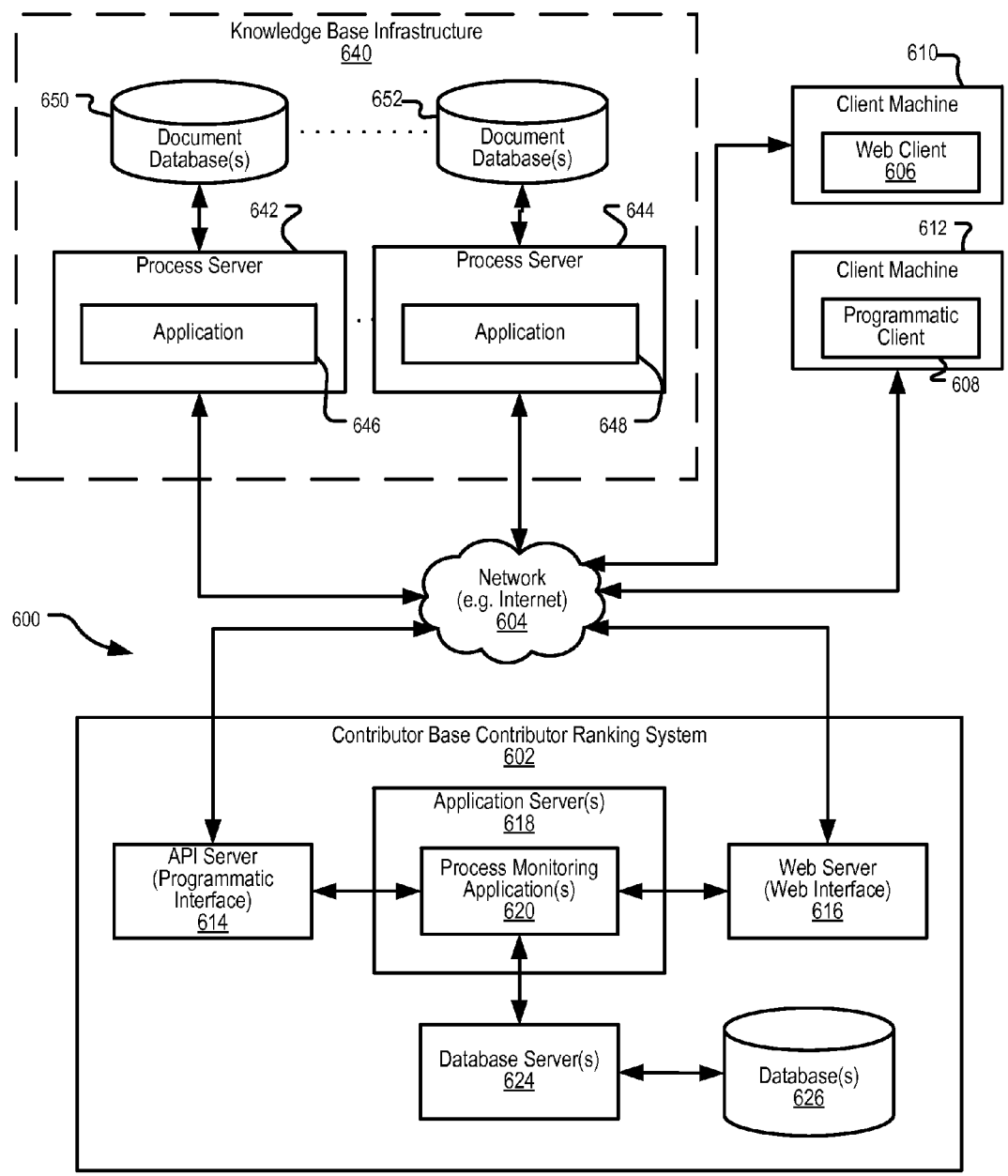
FIG. 6 is a schematic block diagram of an environment in which a knowledge base contributor ranking system may be provided, in accordance with another example embodiment.
Figure 7:
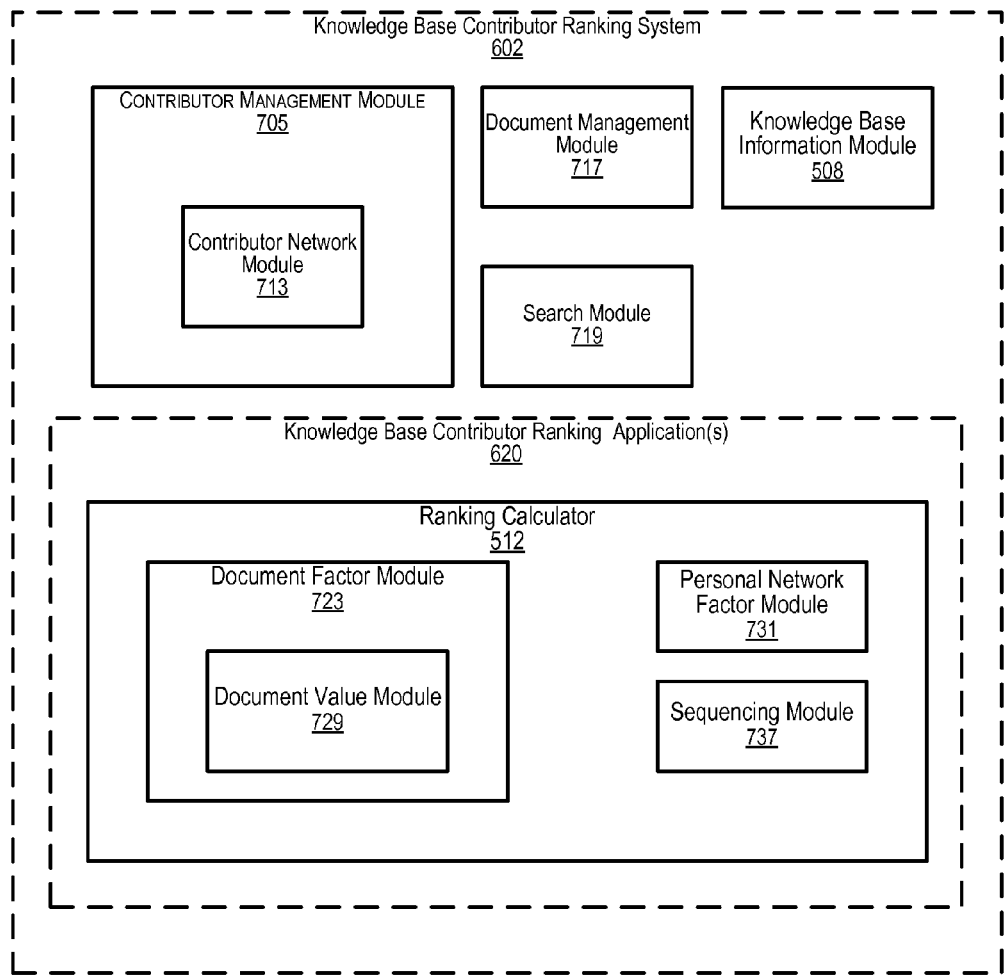
FIG. 7 is a schematic block diagram of the example modules and components forming part of a knowledge base contributor ranking system in accordance with an example embodiment.

FIG. 6 is a schematic network diagram that shows a more detailed view of a knowledge base contributor ranking system 602, in accordance with another example embodiment, with like reference numerals indicating like parts in FIG. 5 and in FIG. 6. In FIG. 6 an example environment comprising a knowledge base management system 600 implemented with a client-server architecture within which an example embodiment of the knowledge base contributor ranking system 602 may be provided. It is to be appreciated that the example environment architecture illustrated with reference to FIGS. 6 and 7 is only one of many possible configurations for employing the methodologies disclosed herein. In the embodiment of FIG. 6, the knowledge base contributor ranking system 602 provides server-side functionality, via a network 604 (e.g., via the Internet, a Wide Area Network (WAN), or a Local Area Network (LAN)) to one or more client machines. FIG. 6 illustrates, for example, a web client 606 (e.g., a browser, such as the Internet Explorer browser developed by Microsoft Corporation of Redmond, Wash.), and a programmatic client 608 executing on respective client machines 610 and 612.

An Application Program Interface (API) server 614 and a web server 616 are coupled to, and provide programmatic and web interfaces respectively to, one or more application servers 618. The application servers 618 host one or more knowledge base contributor ranking application(s) 620 (see also FIG. 7). The application server(s) 618 are, in turn, connected to one or more databases server(s) 624 that facilitate access to one or more database(s) that may, for example, include the document information 516 and on the personal network information 518.

The knowledge base contributor ranking system 602 is in communication with a physical platform that hosts the knowledge base, further referred to as the knowledge base infrastructure 640 that hosts the knowledge base. The knowledge base infrastructure 640 may, for example, include IT components in the form of servers 642, 644, software applications 646, 648, and document databases 650, 652, that may together provide for creation and storage of the knowledge documents 108 and associated metadata. It will be appreciated that the knowledge base infrastructure 640 may comprise a large number of process servers 642, 644 and document databases 650, 652; FIG. 6 shows only two such process servers 642, 644, for ease of explanation. Further components of the knowledge base infrastructure 640 may include various user devices or endpoint devices such as, for example, user terminals or client computers, software applications executing on user devices, printers, scanners, and the like.

The knowledge base contributor ranking application(s) 620 may provide a number of automated functions for ranking contributors to a knowledge base and may also provide a number of functions and services to users that access the system 602, for example providing analytics, diagnostic, predictive and management functionality relating to ranking contributors to a knowledge base. Respective modules for providing these functionalities are discussed in further detail with reference to FIG. 7 below. While all of the functional modules, and therefore all of the knowledge base contributor ranking application(s) 620 are shown in FIG. 6 to form part of the knowledge base contributor ranking system 602, it will be appreciated that, in alternative embodiments, some of the functional modules or process model applications may form part of systems that are separate and distinct from the customer support system 602, for example to provide outsourced SLA compliance management for a customer support system.

The web client 606 accesses the knowledge base contributor ranking application(s) 620 via the web interface supported by the web server 616. Similarly, the programmatic client 608 accesses the various services and functions provided by the knowledge base contributor ranking application(s) 620 via the programmatic interface provided by the API server 614.

Again, although the example system 602 shown in FIG. 6 employs a client-server architecture, the example embodiments and this disclosure are not limited to such an architecture, and could equally well find application in a distributed, or peer-to-peer, architecture system, for example. The knowledge base contributor ranking application(s) 620 could also be implemented as standalone software programs, which do not necessarily have networking capabilities.

Knowledge Base Contributor Ranking Application(s)

FIG. 7 is a schematic block diagram illustrating multiple functional modules of the knowledge base contributor ranking application(s) 620 in accordance with one example embodiment. Although the example modules are illustrated as forming part of a single application, it will be appreciated that the modules may be provided by a plurality of applications. The modules of the application(s) 620 may be hosted on dedicated or shared server machines (not shown) that are communicatively coupled to enable communication between server machines. At least some of the modules themselves are communicatively coupled (e.g., via appropriate interfaces) to each other and to various data sources, so as to allow information to be passed between the modules or so as to allow the modules to share and access common data. The modules of the application(s) 620 may furthermore access the one or more databases 626 via the database servers 624.

The system 602 may provide a number of modules to provide various functionalities for performing example methods of ranking contributors to a knowledge base, for example including the knowledge base information module 508. The system 602 may, for example, include a contributor management module 705 to manage contributor networks and data related thereto. A contributor network module 713 may be provided to maintain follower networks that are indicated by the personal network information. The system 602 may also include a document management module 717 to manage the documents 108 in the knowledge base 100, and to gather, collate, and update the document information 120. Search functionality to allow user-initiation of contributor searches based on ranking value may be provided by a search module 719.

The system 602 may also include the knowledge base contributor ranking application(s) 620, which may comprise modules that are configured to provide a hardware-implemented ranking calculator 512, as described above with reference to FIG. 5.

The knowledge base contributor ranking application(s) 620 may comprise a document factor module to calculate, for each contributor, a document factor representing a cumulative value of contributions of the contributor to documents in the knowledge base 100. This may comprise a document value module 729 to calculate respective document values for multiple documents to which the particular contributor has contributed.

A personal network factor module 731 may be included to calculate the personal network factor for a particular contributor based at least in part on respective ranking values of the one or more followers in the follower network of which the particular contributor is the target contributor. The system 602 may also include a sequencing module 737 to determine a calculation sequence based at least in part on respective initial ranking values, with lower initial ranking values being earlier in the calculation sequence based at least in part on respective initial ranking values.

Further functionalities of the knowledge base contributor ranking application(s) 620 are described with reference to example methods described herein.

Modules, Components, and Logic of Example Embodiments

Certain embodiments are described herein as including logic or a number of components, modules, or mechanisms. Modules may constitute either software modules, with code embodied on a non-transitory machine-readable medium (i.e., such as any conventional storage device, such as volatile or non-volatile memory, disk drives or solid state storage devices (SSDs), etc.), or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry or in temporarily configured circuitry (e.g., configured by software), may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Figure 8:
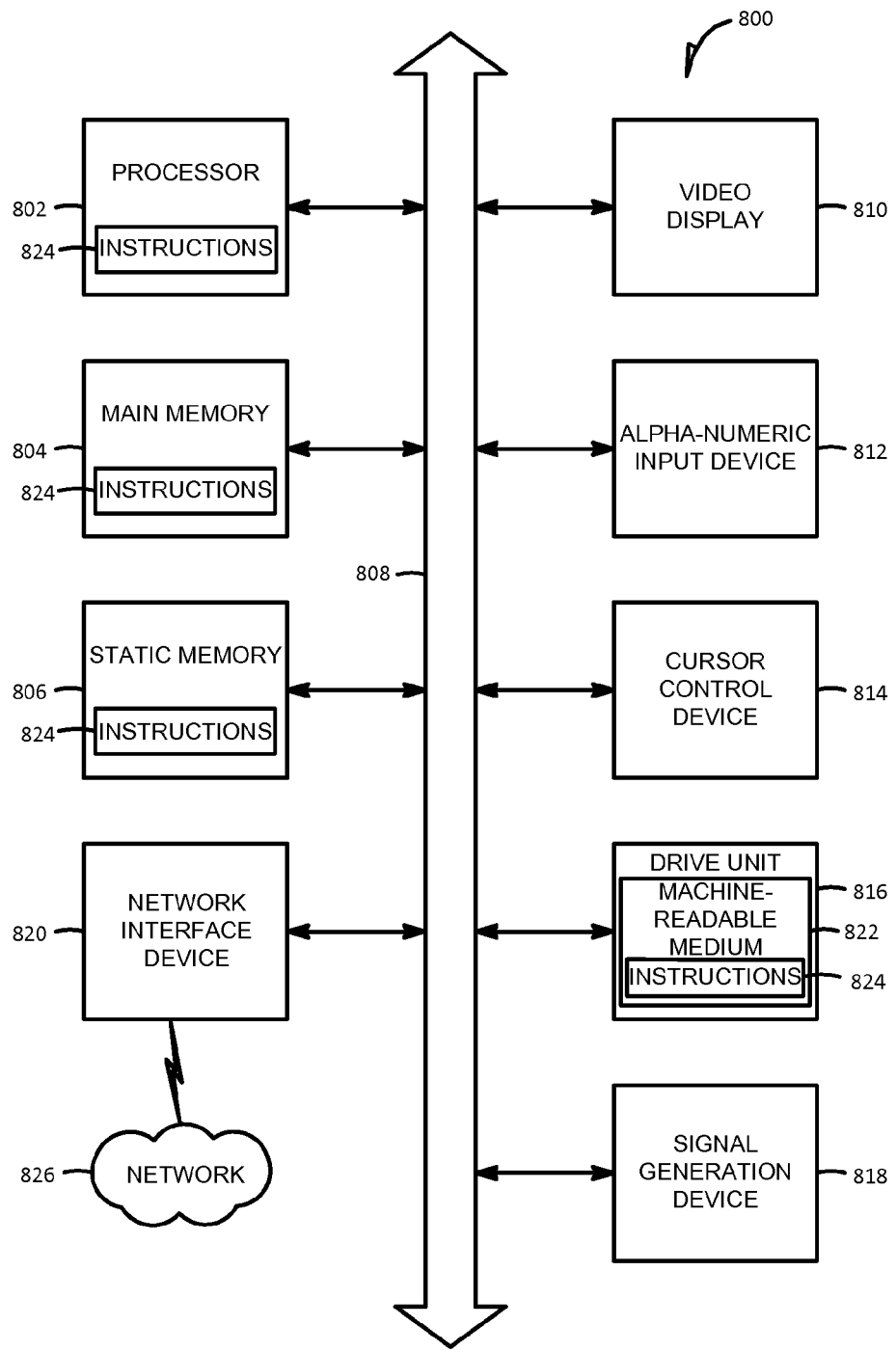
FIG. 8 is a diagrammatic representation of a machine in the example form of a computer system within which a set of instructions for causing the machine to perform any one or more of the methodologies discussed herein may be executed.

FIG. 8 shows a diagrammatic representation of a machine in the example form of a computer system 800 within which a set of instructions, for causing the machine to perform any one or more of the methodologies discussed herein, may be executed. For example, the system 100 (FIG. 1) or any one or more of its components (FIGS. 1 and 2) may be provided by the system 800.

In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a cursor control device 814 (e.g., a mouse), a disk drive unit 816, an audio/video signal input/output device 818 (e.g., a microphone/speaker) and a network interface device 820.

The disk drive unit 816 includes a machine-readable storage medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting non-transitory machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database and/or associated caches and servers) that store the one or more sets of instructions. The term "machine-readable medium" shall also be taken to include any medium that is capable of storing a set of instructions for execution by the machine and that cause the machine to perform any one or more of the methodologies of this disclosure. The term "machine-readable medium" shall accordingly be taken to include, but not be limited to, solid-state memory devices of all types, as well as optical and magnetic media.

The described example embodiments therefore disclose, inter alia, a system and method to rank contributors to a knowledge base. The method may comprise: accessing one or more memories that store document information about documents in a knowledge base, the document information identifying relationships between the documents and contributors to the knowledge base, and accessing personal network information that indicate defined personal connections in the knowledge base between the contributors; and, in an automated operation, calculating respective ranking values for two or more of the contributors based at least in part on the document information and on the personal network information.

Calculating the ranking values may comprise, calculating, for each of the two or more contributors: a document factor that represents a quantified cumulative value of contributions of the contributor to documents in the knowledge base; and a personal network factor that represents a quantified value of the defined relationships between the contributor and other contributors in the knowledge base.

Calculating the document factor for a particular contributor may comprise calculating respective document values for multiple documents to which the particular contributor has contributed. Calculating a document value for a particular document may be based at least in part on: a readership volume parameter representative of the number of contributors who have read the particular document; and a ratings parameter derived from ratings of the particular document by respective contributors. In some embodiments, calculating the document value may comprise deriving a weighted combination of the ratings parameter and the readership volume parameter, the ratings parameter being given a greater weight than the readership volume parameter.

Calculating the document factor may further comprise determining a particular contribution type for each of the multiple documents, the contribution type being selected from a predefined set of contribution types indicative of the nature of respective relationships between the particular contributor and the relevant document. A weighting may then be applied to each document value based on the respective determined contribution type, to obtain a weighted document value for each of the multiple documents whereafter the multiple weighted document values may be summed.

The set of contribution types may consist of being an author of the document, being a rater of the document, and being a reader of the document, and the applying of weightings to the documents may comprise giving the greatest weighting to documents for which the particular contributor is the author. A ratio of the weighting for being the author relative to the weighting for being a rater may be in the range 1:0.55-1:0.65.

The personal network information may indicate structured follower networks associated with the knowledge base, each structured follower network comprising one or more followers who are registered to follow a target contributor.

The calculating of the personal network factor for a particular contributor may be based at least in part on respective ranking values of the one or more followers in the follower network of which the particular contributor is the target contributor. Calculating of the personal network factor may comprise summing the ranking values of the one or more followers in the follower network of the particular contributor.

In some embodiments, calculating the ranking values for two or more contributors may be an iterative process comprising repeated calculation of interim ranking values for the two or more contributors. The iterative process may comprise calculating the interim ranking values in a sequence determined at least in part by respective initial ranking values, with lower initial ranking values being earlier in the sequence. In such a case, after a first iteration of the iterative process, the initial ranking values may comprise the interim ranking values produced by an immediately preceding iteration of the iterative process.

The method may further comprise determining the sequence based at least in part on a document volume parameter that indicates a quantity of documents to which respective contributors contributed. In such a case, the calculating of the ranking values may further comprise determining that a plurality of the contributors have equal initial ranking values, and forming the sequence such that, of the plurality of contributors, those with higher document volume parameters are later in the sequence.

Calculation of ranking values may be performed during a search process. The method may thus comprise receiving a search query including one or more search parameters, identifying candidate contributors in the knowledge base that satisfy the search parameters, the determining of the ranking values being performed responsive to the search query, and producing a search result based at least in part on the determined ranking values.

The search query may indicate one or more targeted knowledge topics selected from a predefined set of knowledge topics, in which case the determining of ranking values may further comprise filtering the knowledge base to exclude from information on which the determining is based documents and/or contributors who are not linked by associated metadata to the targeted knowledge topics.

Although these methods and systems have been described with reference to specific example embodiments, it will be evident that various modifications and changes may be made to these embodiments without departing from the broader spirit and scope thereof. Accordingly, the specification and drawings are to be regarded in an illustrative rather than a restrictive sense.

The Abstract of the Disclosure is provided to comply with 37 C.F.R. 41.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the disclosed subject matter lies in less than all features of a single disclosed embodiment. Thus, the following claims are hereby incorporated into the Detailed Description, with each claim standing on its own as a separate embodiment.

What is claimed is:

1. A method comprising:
  accessing one or more memories that store document information about documents in a knowledge base, the document information identifying relationships between the documents and contributors to the knowledge base, and personal network information with respect to personal networks of respective contributors to the knowledge base, each personal network defining personal connections between respective contributors forming part of the personal network, wherein each personal network is structured such that nodes of the network are provided by the respective contributors, each personal connection comprises a connection defined directly between two of the nodes of the personal network; and in an automated operation using one or more processors, calculating respective ranking values for two or more of the contributors, the calculating of the respective ranking values comprising, for each of the two or more contributors:
- calculating a document factor calculated as a quantified value based on one or more properties of the document information for the corresponding contributor,
- calculating a personal network factor calculated as a quantified value based on one or more properties of the personal network information of the corresponding contributor, and
- calculating the ranking actor based at least in part on the document factor and based at least in part on the personal network factor.

2. The method of claim 1, wherein:
the document factor represents a quantified cumulative value of contributions of the contributor to documents in the knowledge base; and
the personal network factor represents a quantified value of the defined relationships between the contributor and other contributors in the knowledge base.

3. The method of claim 2, wherein the calculating of the document factor for a particular contributor comprises calculating respective document values for multiple documents to which the particular contributor has contributed.

4. The method of claim 3, wherein the calculating of the document value for a particular document is based at least in part on:
- a readership volume parameter representative of the number of contributors who have read the particular document; and
- a ratings parameter derived from ratings of the particular document by respective contributors.

5. The method of claim 4, wherein the calculating of the document value comprises a weighted combination of the ratings parameter and the readership volume parameter, the ratings parameter being given a greater weight than the readership volume parameter.

6. The method of claim 3, wherein calculating the document factor further comprises:
- determining a particular contribution type for each of the multiple documents, the contribution type being selected from a predefined set of contribution types indicative of the nature of respective relationships between the particular contributor and the relevant document;
- applying a weighting to each document value based on the respective determined contribution type, to obtain a weighted document value for each of the multiple documents; and
- summing the multiple weighted document values.

7. The method of claim 6, wherein the set of contribution types consists of being an author of the document, being a rater of the document, and being a reader of the document, the applying of weightings to the documents comprising giving the greatest weighting to documents for which the particular contributor is the author.

8. The method of claim 7, wherein a ratio of the weighting for being the author relative to the weighting for being a rater is in the range 1:0.55-1:0.65.

9. The method of claim 2, wherein the personal network information indicate structured follower networks associated with the knowledge base, each structured follower network comprising one or more followers who are registered to follow a target contributor.

10. The method of claim 9, wherein the calculating of the personal network factor for a particular contributor is based at least in part on respective ranking values of the one or more followers in the follower network of which the particular contributor is the target contributor.

11. The method of claim 10, wherein the calculating of the personal network factor comprises summing the ranking values of the one or more followers in the follower network of the particular contributor.

12. The method of claim 10, wherein the calculating of the ranking values for the two or more contributors is an iterative process comprising repeated calculation of interim ranking values for the two or more contributors.

13. The method of claim 12, wherein the iterative process comprises calculating the interim ranking values in a sequence determined at least in part by respective initial ranking values, with lower initial ranking values being earlier in the sequence.

14. The method of claim 13, wherein, after a first iteration of the iterative process, the initial ranking values comprise the interim ranking values produced by an immediately preceding iteration of the iterative process.

15. The method of claim 13, further comprising determining the sequence based at least in part on a document volume parameter that indicates a quantity of documents to which respective contributors contributed, the calculating of the ranking values further comprising:
- determining that a plurality of the contributors have equal initial ranking values; and
- forming the sequence such that, of the plurality of contributors, those with higher document volume parameters are later in the sequence.

16. The method of claim 1, further comprising:
- receiving a search query including one or more search parameters;
- identifying candidate contributors in the knowledge base that satisfy the search parameters, the determining of the ranking values being performed responsive to the search query; and
- producing a search result based at least in part on the determined ranking values.

17. The method of claim 16, wherein the search query indicates one or more targeted knowledge topics selected from a predefined set of knowledge topics, and wherein the determining of ranking values further comprises filtering the knowledge base to exclude from information on which the determining is based documents and/or contributors who are not linked by associated metadata to the targeted knowledge topics.

18. A system comprising:
a knowledge base information module comprising one or more computer processor devices configured to access one or more memories that store document information about documents in a knowledge base, the document information identifying relationships between the documents and contributors to the knowledge base, and personal network information with respect to personal networks of respective contributors to the knowledge base, each personal network defining personal connections between respective contributors forming part of the personal network, wherein each personal network is structured such that nodes of the network are provided by the respective contributors, each personal connection comprises a connection defined directly between two of the nodes of the personal network;
a ranking calculator comprising at least one computer processor device configured to perform one or more automated operations to calculate respective ranking values for two or more of the contributors, the ranking calculator comprising:

a document factor module to calculate for each of the two or more contributors a document factor calculated as a quantified value based on one or more properties of the document information for the corresponding contributor, and a personal network factor module to calculate for each of the two or more contributors a personal network factor calculated as a quantified value based on one or more properties of the personal network information of the corresponding contributor, the ranking calculator being configured to calculate the respective ranking factors based at least in part on the corresponding document factor and based at least in part on the corresponding personal network factor.

19. The system of claim 18, wherein the document factor module is configured to calculate for each of the two or more contributors a document factor that represents a quantified cumulative value of contributions of the contributor to documents in the knowledge base.

20. The system of claim 19, wherein the document factor module comprises a document value module to calculate respective document values for multiple documents to which the particular contributor has contributed.

21. The system of claim 20, wherein the document value module is configured to calculate the document value for a particular document based at least in part on:

a readership volume parameter representative of the number of contributors who have read the particular document; and a ratings parameter derived from ratings of the particular document by respective contributors.

22. The system of claim 21, the document value module is configure to calculate the document value in an operation that comprises weighted combination of the ratings parameter and the readership volume parameter, the ratings parameter being given a greater weight than the readership volume parameter.

23. The system of claim 20, wherein the document factor module is further configured to calculate the document factor by a process that comprises:

determining a particular contribution type for each of the multiple documents, the contribution type being selected from a predefined set of contribution type indicative of the nature of respective relationships between the particular contributor and the relevant document;

applying a weighting to each document value based on the respective determined contribution type, to obtain a weighted document value for each of the multiple documents; and summing the multiple weighted document.

24. The system of claim 23, wherein the set of contribution types consists of being an author of the document, being a rater of the document, and being a reader of the document, the applying of weightings to the documents comprising giving the greatest weighting to documents for which the particular contributor is the author.

25. The system of claim 24, wherein a ratio of the weighting for being the author relative to the weighting for being a rater is in the range 1:0.55-1:0.65.

26. The system of claim 19, further comprising a contributor network module to maintain follower networks that are indicated by the personal network information, each structured follower network comprising one or more followers who are registered to follow a target contributor.

27. The system of claim 26, wherein the personal network factor module is configured to calculate the personal network factor for a particular contributor based at least in part on respective ranking values of the one or more followers in the follower network of which the particular contributor is the target contributor.

28. The system of claim 27, wherein the personal network factor module is configured to calculate the personal network factor by summing the ranking values of the one or more followers in the follower network of the particular contributor.

29. The system of claim 27, wherein the ranking calculator is configured to calculate the ranking values for the two or more contributors in an iterative process comprising repeated calculation of interim ranking values for the two or more contributors.

30. The system of claim 29, wherein the ranking calculator is configured to calculate the interim ranking values in an iterative process that comprises calculating the interim ranking values in a calculation sequence, the system further comprising a sequencing module to determine the calculation sequence based at least in part on respective initial ranking values, with lower initial ranking values being earlier in the calculation sequence.

31. The system of claim 30, wherein the sequencing module is configured such that, after a first iteration of the iterative process, the initial ranking values comprise the interim ranking values produced by an immediately preceding iteration of the iterative process.

32. The system of claim 30, wherein the sequencing module is further configured to determine the calculation sequence based at least in part on a document volume parameter that indicates a quantity of documents to which respective contributors contributed, the ranking calculator further being configure to calculate the ranking values in an operation comprising:

determining that a plurality of the contributors have equal initial ranking values; and forming the sequence such that, of the plurality of contributors, those with higher document volume parameters are later in the sequence.

33. The system of claim 18, further comprising a search module to:

receive a search query including one or more search parameters;

identify candidate contributors in the knowledge base that satisfy the search parameters; and produce a search result based at least in part on the ranking values for the respective candidate contributors.

34. The system of claim 33, wherein the search query indicates one or more targeted knowledge topics selected from a predefined set of knowledge topics, and wherein search module is configured to filter the knowledge base to exclude from information on which calculation of the ranking values is based documents and/or contributors who are not linked by associated metadata to the targeted knowledge topics.

35. A non-transitory machine-readable storage medium storing instructions which, when performed by a machine, cause the machine to:

access one or more memories that store document information about documents in a knowledge base, the document information identifying relationships between the documents and contributors to the knowledge base, and personal network information that with respect to personal networks of respective contributors to the knowledge base, each personal network defining personal connections between respective contributors forming part of the personal network, wherein each personal network is structured such that nodes of the network are provided by the respective contributors, each personal connection comprises a connection defined directly between two of the nodes of the personal network; and calculate respective ranking values for two or more of the contributors, the calculating of the respective ranking values comprising, for each of the two or more contributors:

calculating a document factor calculated as a quantified value based on one or more properties of the document information for the corresponding contributor, calculating a personal network factor calculated as a quantified value based on one or more properties of the personal network information of the corresponding contributor, and calculating the ranking factor based at least in part on the document factor and based at least in part on the personal network factor.

\* \* \* \* \*